United States Patent [19]

Hauschulz et al.

[11] 3,963,610

[45] June 15, 1976

[54] METHOD OF REMOVING PHENOL FROM WASTE WATER

[75] Inventors: Bruno Hauschulz, Gladbeck; Heinrich von Barneveld, Kirchhellen; Wilfried Jordan; Josef Mertmann, both of Gladbeck; Gerhard Rasner, Recklinghausen; Harri Brenienek, Gladbeck, all of Germany

[73] Assignee: Phenolchemie GmbH, Gladbeck, Germany

[22] Filed: Oct. 1, 1973

[21] Appl. No.: 381,126

[30] Foreign Application Priority Data

July 20, 1972 Germany............................ 2235493

[52] U.S. Cl. ............................................... 210/21
[51] Int. Cl.² ........................................ B01D 11/04
[58] Field of Search.................... 210/21; 260/627 R, 260/627 B; 208/263

[56] References Cited
UNITED STATES PATENTS

| | | | |
|---|---|---|---|
| 2,807,654 | 9/1957 | Grimmett et al. | 210/21 |
| 3,300,405 | 1/1967 | Black | 210/21 |
| 3,446,732 | 5/1969 | Gasser et al. | 210/21 |

*Primary Examiner*—Frank A. Spear, Jr.
*Attorney, Agent, or Firm*—Burgess, Dinklage & Sprung

[57] ABSTRACT

Phenol is removed from waste waters that occur in the manufacture of phenol by the cumene process wherein cumene is used as an extractant. The cumene which is used for extracting the phenol from the waste water and which is thereafter washed with sodium hydroxide to remove the phenol is treated prior to this washing with an aqueous solution of 1 to 20 wt-% preferably 5 to 10 wt-% sodium carbonate. If desired the aqueous solution can also contain sodium sulphate in amounts of 1 to 15% by weight. The sodium carbonate solution may also contain a non-ionogenic, surface-active substance such as aryl polyglycol ethers in amounts of from 0.001 to 1% by weight.

5 Claims, No Drawings

METHOD OF REMOVING PHENOL FROM WASTE WATER

BACKGROUND

This invention relates to a process for removing phenol from waste waters and in particular to a method for removing phenol from waste waters that occur in the manufacture of phenol by the cumene process wherein cumene is used as an extractant.

In the course of time numerous processes for removing phenol from waste waters have become known. Most of these processes have to do with the dephenolization of waste waters such as those produced in coke plants. In almost every case the phenol-containing waste waters are treated with extractants, the phenol being absorbed by the extractant. The phenol may be recovered from these phenol-laden extractants in a number of ways.

Processes have been developed in which the solvent is distilled from the phenol provided that these solvents have a lower boiling point than phenol. On the other hand, processes have also become known in which the phenol is separated from the extractant by distillation, that is, in cases in which the extractant has a higher boiling point than phenol.

Very frequently methods are used for recovering the phenol from the extractant in which the phenol is washed out with alkalies, especially soda lye.

In the manufacture of phenol by the cumene process, waste waters are produced which differ considerably in their composition from those produced in the processing of tars. It may be said that the compositions of these waste waters differ basically from one another, and in general the only contaminant component they have in common is phenol.

Accordingly, new methods have had to be developed for treating the waste waters which are produced in the manufacture of phenol by the cumene process. Here, again, the approach has been to extract these waste waters with solvents, and benzene, toluene, xylene, cumene, acetophenone, mesityl oxide, butyl acetate, tricresyl phosphate and other substances have been proposed. Furthermore, mixtures, such as mesityl oxide with benzene, toluene, xylene or cumene, have been represented as especially effective. Likewise, acetophenone mixed with other aromatics has been described as especially effective.

In addition to the use of pure organic extractants and mixtures of extractants, it has been proposed to reduce the pH of the waste waters, because it is said that in the acid ranges the dephenolization can be performed to a particularly complete degree. pH values especially ranging from 2 to 4 have been named. In addition, sodium phenolate solutions, which are to have a very constant content of free soda lye, have simultaneously been used for the removal of the phenol from the extractants.

Owing to the great number of processes proposed for the dephenolization of waste waters and for the removal of the phenol from the extractants, it is apparent that most of these processes are not satisfactory and either involve difficulty in their technical application or are not at all practical.

For example, the technical practice of the method described in German Pat. 1,075,119 has proven to be inordinately expensive because the waste waters to be dephenolized have to be greatly acidified. In general, a pH value of 1, or usually even less, has to be established in order to permit the trouble-free extraction of the phenol with cumene. In the case of higher pH values, strata develop during the extraction, in which water and cumene, contaminated with components of the waste water, form a kind of emulsion which cannot be broken down at pH values above 1, and which not only encumber the procedure but make the dephenolization virtually impossible.

These emulsion layers, hereinafter to be called "floc layers," become concentrated, and as a result waste water containing cumene, on the one hand, and cumene containing waste water, on the other hand, are discharged from the separating tank. The waste water containing cumene still contains appreciable amounts of the phenol, and the cumene containing waste water leads to considerable trouble in the cumene washing operation that follows, in which soda lye is involved.

Only through very great acidification of the waste water has it been possible in any way to remedy these difficulties. The consequence of this necessary measure has been an inordinately great consumption of sulfuric acid which is used for the acidification. Before this very acid waste water can be discharged into the sewage system after the dephenolization it is necessary to neutralize it, and this results in correspondingly high consumption of soda lye. As a consequence of this procedure there is a high salt content in the waste water.

On account of the great acidification of the waste water being dephenolized, the entire dephenolization apparatus has to be made of high grade steel.

As a result of the measures described above, and of the expense which they entail, the earnings from the phenolate lye or from the phenol produced therefrom fall far short of covering the costs involved.

Numerous series of experiments attempting to eliminate the separating difficulties have shown that in the extraction of waste waters of the kind produced in the manufacture of phenol by the cumene process, not only phenol but numerous other impurities find their way into the extractant. Of these impurities the "floc forming" substances are exceedingly troublesome. In the lye washing that follows not only phenol but also these floc forming substances are absorbed by the lye and after the phenolate lye is broken down they get back into the waste water being dephenolized. The floc forming substances are concentrated by this necessary recirculation and cause the above-described difficulties.

SUMMARY

It has now surprisingly been found that these difficulties can be eliminated in the process of dephenolizing waste waters of the kind produced in the manufacture of phenol by the cumene process using cumene as the extractant if the cumene which is used for the extraction of the phenol from the waste water and which is then washed with soda lye NaOH to remove the phenol is treated prior to this washing with an aqueous solution of 1 to 20 wt-%, preferably 5 to 10 wt-%, sodium carbonate, which if desired may also contain sodium sulfate in amounts of 1 to 15% by weight. By these measures the floc forming substances originating from the waste waters, whose identification has hitherto been impossible, are washed out of the cumene and withdrawn from circulation.

DESCRIPTION

It has been proven by numerous series of experiments that sodium carbonate solutions are effective over the wide concentration range of 1 to 20% by weight, and the concentration range from 5 to 10% by weight has proven to be the most advantageous in its washing action as regards the removal of the floc forming substances. In the case of low concentrations of sodium carbonate in the aqueous solution it has been possible to achieve an additional favorable effect on the separating action by the addition of sodium sulfate.

Similar observations have been made when small amounts of non-ionogenic surface-active substances such as aryl polyglycol ethers are added to the above-mentioned aqueous sodium carbonate solutions. These additives are used preferably in amounts of 0.001 to 1% by weight. Even less than the stated minimum produces a plainly apparent effect. The possibility of using greater amounts, however, is precluded mainly for naught but economic reasons. The surface-active substances may also be added to the waste water being dephenolized or to the cumene serving for the extraction, or to both phases.

Aryl polyglycol ethers are preferably used as non-ionogenic surface active substances, such as for example alkyl phenyl ethers of polyethylene glycol and polypropylene glycol, especially nonyl phenyl ethers of these glycols. Products of this kind are sold under the name of "tergitol nonionics."

The aryl polyglycol ether supplied by Farbenfabriken Bayer AG under the name Emulgator W/M has proven especially effective.

The invention will be explained through the following examples.

EXAMPLE 1 (for purposes of comparison)

In each of these experiments, 500 ml of waste water and 500 ml of cumene were placed in a one-liter shaking cylinder provided with a glass stopper. The two phases were mixed vigorously together for one minute. After the two phases had separated, the volume of the floc layer formed between the water phase and the cumene phase was measured.

The phenol-containing waste water had the following analysis:

| | |
|---|---|
| pH value | 6.1 |
| Phenol | 1.2 wt-% |
| Acetone | 2.9 wt-% |
| Evaporation residue | 10.8 wt-% |

The evaporation residue specified consisted to a large degree of sodium sulfate and contained small amounts of sodium acetate, sodium formiate and unknown salts or salt-like compounds as well as condensation and polymerization products. Through the addition of varying amounts of sulfuric acid to the phenol-containing waste water the latter was adjusted to different pH values.

The cumene used for the extraction had the following composition:

| | |
|---|---|
| Acetone | 0.1 wt-% |
| Methyl isobutylketone | 0.15 wt-% |
| Ethyl benzene | 0.25 wt-% |
| n-Propyl benzene | traces |
| alpha-Methylstyrene | 0.05 wt-% |
| Butyl benzenes | 3.25 wt-% |
| Cumene | 96.1 wt-% |

The results obtained are summarized in the following Table 1:

| Example No. | Amount Waste Water (ml) | Amount of Cumene (ml) | Addition of sulfuric acid concentrated (g) | pH-value | volume of floc layer (ml) |
|---|---|---|---|---|---|
| 1a | 500 | 500 | 1 | 5 | 20 to 30 |
| 1b | 500 | 500 | 3.5 | 4 | 20 to 30 |
| 1c | 500 | 500 | 6.5 | 3 | 15 to 20 |
| 1d | 500 | 500 | 9.5 | 2 | about 10 |
| 1e | 500 | 500 | 23.5 | 1 | traces |

The results of Table 1 show that with decreasing pH-value the volume of the floc layer between the water phase and the cumene phase decreases. It is noticeable that at a pH-value of 3 and even in a relatively strongly acid waste water with a pH-value of 2 the floc volumes are still so considerable that a trouble free dephenolization is not possible. Only by the addition of further considerable amounts of acid to the waste water one succeeds at a pH-value of about 1 to avoid the formation of floc layers and thus a trouble-free dephenolization of the waste water.

EXAMPLE 2 (for purposes of comparison):

In order to illustrate that the floc forming agent or floc forming agents originate from the factory waste water and at low pH values are appreciably absorbed by the cumene, comparison examples were conducted, in which test waste waters were washed with the extraction cumene, as described in Example 1.

The test waste water was adjusted in accordance with the characteristics of the waste water:

| | |
|---|---|
| pH value | 6.1 |
| Phenol | 1.2 wt-% |
| Acetone | 2.9 wt-% |
| Evaporation residue | 10.8 wt-% |

The evaporation residue contained essentially sodium sulfate and small amounts of sodium acetate and sodium formiate. The unknown substances could not be added.

The pH value of this test waste water was then adjusted to 5 as in Example 1a. The dephenolization performed in the same manner as in Example 1 showed that, when the two phases were shaken together, immediate separation occurred and not even traces of floc formation could be observed. From this it can be concluded with certainty that the floc forming agent is contained neither in the cumene nor in the test waste water, but originates from the factory waste waters and, when the pH values are sufficiently low, it passes into the organic phase, that is, into the cumene.

EXAMPLE 3 (for purposes of comparison)

The same test waste water was used in this experiment as the one described in Example 2. The organic phase used was the cumene produced in accordance with Example 1, Table 1, under 1e, i.e., by the treatment of very acid factory waste waters. When the test waste water was mixed with the described cumene, a heavy formation of floc occurred at once, its volume amounting to about 20 to 30 ml. This example shows that, upon strong acidification, the floc forming agent is transferred largely to the cumene and then, when the cumene is mixed with test waste water free of floc forming substances, the floc forming agent produces its full effect.

EXAMPLE 4 (for purposes of comparison)

The phenol-laden cumene produced under Example 1e in Table 1 was treated with soda lye to remove the phenol. This soda lye containing phenolate was used to neutralize a cleavage product such as is produced when cumene hydroperoxide is decomposed with sulfuric acid in the cumene process. The aqueous phase thus produced has approximately the composition described in Example 1, and was treated as waste water with cumene having a composition like the one described in Example 1.

Virtually the same results were achieved as summarized in Table 1 under Example 1, i.e., at a pH of approximately 5, 4 and 3, heavy floc formation occurred, which diminished at a pH of 2 and occurred only in traces at a pH of 1. This example shows that the floc forming agent is displaced into the extraction cumene, that in the extraction of phenol with lye it is picked up by the lye and to a large extent remains in the aqueous phase, i.e., in the waste water under factory conditions, and therefore constantly, as a consequence of the recirculation that exists, has a disturbing effect on the dephenolization.

EXAMPLE 5 (in accordance with the invention):

The procedure used in this example was the same as that of Example 4, except that the cumene was subjected, prior to the extraction of the phenol with soda lye, to a washing with aqueous sodium carbonate solution, the sodium carbonate content of the solution being 10% by weight. After this cumene had been dephenolized with soda lye and the alkaline phenolate lye thus produced was used for the neutralization of cleavage product as in Example 4, an aqueous phase containing phenol resulted which was the same as the aqueous phase in Example 4.

The difference became apparent just as soon as the aqueous phase of this example was treated with cumene to extract the phenol. Even when the aqueous phase has a high pH value, i.e., at pH values of 5 and 4, no floc was formed. Only at the phase boundaries could indications of floc formation be observed.

This experiment showed that the floc forming agent is washed out of the cumene with aqueous sodium carbonate solution. The floc forming agent is thus unable to pass on to the phenolate lye and consequently it cannot recirculate. In this manner the trouble caused by the floc forming agent is forestalled.

EXAMPLE 6 (in accordance with the invention)

The procedure in these experiments was the same as in Example 5, the concentration of the sodium carbonate solution being varied between 0.3 and 18 percent by weight. The values obtained are listed in Table 2.

Table 2:

| Ex. No. | Concentration of the Sodium Carbonate Solution (weight-%) | Separation of Sodium Carbonate Solution from Cumene | Washed Cumene (ml) | Waste Water (ml) | Floc (ml) |
| --- | --- | --- | --- | --- | --- |
| 6a | 18 | very good | 500 | 500 | none |
| 6b | 10 | very good | 500 | 500 | none |
| 6c | 5 | good | 500 | 500 | none |
| 6d | 1 | adequate | 500 | 500 | about 2 |
| 6e | 0.3 | inadequate | 500 | 500 | about 5 |

It appears from the experiments set forth in Table 2 that the floc forming agent that is taken up by the cumene in the cumene extraction of the waste water is removed from the cumene by washing the latter with sodium carbonate solution and is thus removed from circulation. It is also apparent from the table that washing with sodium carbonate solutions above 5% by weight is especially effective. In actual practice it will be preferable to use aqueous sodium carbonate solutions containing 5 to 10 wt-% sodium carbonate.

EXAMPLE 7 (in accordance with the invention)

As it may be seen from Table 2, Examples 6d and 6e, the separation of the two phases when the cumene is washed with these dilute sodium carbonate solutions is not entirely satisfactory, since a certain amount of floc formation can be observed. If sodium sulfate is added to these sodium carbonate solutions, the phase separation is improved and the floc formation is reduced. The results are shown in Table 3.

Table 3

| Example No. | Composition of Washing solution | | Separation of Cumene from Washing Sol. | Washed Cumene (ml) | Waste Water (ml) | Floc formation (ml) |
| --- | --- | --- | --- | --- | --- | --- |
| | $Na_2CO_3$ (%) | $NaSO_4$ (%) | | | | |
| 7a | 5 | 5 | very good | 500 | 500 | none |
| 7b | 1 | 10 | good | 500 | 500 | traces |
| 7c | 0.3 | 15 | good | 500 | 500 | about 2 |

EXAMPLE 8 (in accordance with the invention)

As seen in Examples 6d and 6e of Table 2, poor phase separation is observed when dilute sodium carbonate solutions are used, along with some—though very little—floc formation. Improvements can be achieved in this regard if sodium sulfate is added as in Example 7. A similar effect is observed when small percentages of a non-ionic surface-active substance is added to the sodium carbonate solution, such as a non-ionogenic aryl polyglycol ether, as for example the commercially available "Emulgator W/M" of Farbenfabriken Bayer AG.

These surface-active substances may also be added to the waste water or to the cumene or even to both phase, and the same improvement will be achieved in regard to phase separation and floc formation. The results are listed in Table 4.

Table 4

| Example No. | Composition of Washing Solution Na$_2$CO$_3$ (%) | aryl polyglycol ether (%) | Separation of Cumene from Washing sol. | Washed Cumene (ml) | Waste Water (ml) | Floc formation (ml) |
| --- | --- | --- | --- | --- | --- | --- |
| 8a | 5 | 0.02 | very good | 500 | 500 | none |
| 8b | 1 | 0.02 | satisfactory | 500 | 500 | traces |
| 8c | 1 | 0.1 | good | 500 | 500 | none |
| 8d | 1 | 0.3 | good | 500 | 500 | none |
| 8e | 1 | 0.6 | good | 500 | 500 | none |

What is claimed is:

1. Method of dephenolizing waste waters occurring in the manufacture of phenol by the cumene process using cumene as extractant which comprises treating the cumene which is used for extracting the phenol from the waste water and which thereafter is washed with sodium hydroxide to remove the phenol, prior to this washing with an aqueous solution of 1 to 20 wt-% sodium carbonate.

2. Method of claim 1 wherein said aqueous solution also contains sodium sulfate in amounts of 1 to 15% by weight.

3. Method of claim 1 wherein non-ionogenic, surface-active substances are added to the sodium carbonate solution, preferably in amounts of 0.001 to 1 wt-%.

4. Method of claim 3 wherein the non-ionogenic surface-active substances are added also to the waste water being dephenolized or to the cumene used for the extraction or to both phases.

5. Method of claim 3 wherein aryl polyglycol esters are used as non-ionogenic surface-active substances.

* * * * *